United States Patent [19]

Fetaz et al.

[11] Patent Number: 5,136,954
[45] Date of Patent: Aug. 11, 1992

[54] DEVICE FOR APPLICATION OF GRANULAR, GASEOUS OR LIQUID MATERIAL TO SOIL

[75] Inventors: Paul R. Fetaz, General Delivery, Halkirk, Alberta, Canada; Gerard J. M. Fetaz, Halkirk T0C 1M0, Canada

[73] Assignee: Paul Raymond Fetaz, Alberta, Canada

[21] Appl. No.: 580,816

[22] Filed: Sep. 11, 1990

[30] Foreign Application Priority Data

Sep. 22, 1989 [CA] Canada ................... 612615

[51] Int. Cl.⁵ ................................. A01C 5/00
[52] U.S. Cl. ........................ 111/123; 111/73; 111/124; 111/152; 111/186; 111/80; 172/723; 172/719
[58] Field of Search ............... 111/73, 123, 124, 125, 111/152–156, 186, 187, 188, 80; 172/723, 724, 725, 719

[56] References Cited

U.S. PATENT DOCUMENTS

| | | |
|---|---|---|
| 2,159,652 | 3/1937 | Brunner .................. 111/73 |
| 2,781,733 | 2/1957 | Graham . |
| 3,618,538 | 11/1971 | Brannan . |
| 4,079,680 | 3/1978 | Davis . |
| 4,201,142 | 5/1980 | Stump . |
| 4,592,294 | 6/1986 | Dietrich, Sr. . |
| 4,628,839 | 12/1986 | Edmisson . |
| 4,638,748 | 1/1987 | Kopecky . |
| 4,719,862 | 1/1988 | Edmisson . |
| 4,770,112 | 9/1988 | Neymeyer .................. 111/73 |
| 4,773,340 | 9/1988 | Williams et al. . |

FOREIGN PATENT DOCUMENTS

| | | |
|---|---|---|
| 530673 | 9/1956 | Canada .................. 111/19 |
| 1039582 | 10/1978 | Canada . |
| 1214076 | 11/1986 | Canada .................. 111/19 |

*Primary Examiner*—Randolph A. Reese
*Assistant Examiner*—Timothy Aberle
*Attorney, Agent, or Firm*—Lawrence M. Nawrocki

[57] ABSTRACT

An attachment to an existing sweep of a seeding device is provided for additional dispensing of fertilizer. A protection tooth on the leading face of the attachment can be placed at a desired depth of its lower, free end to selectively adjust the level at which the fertilizer is deposited.

8 Claims, 3 Drawing Sheets

DEVICE FOR APPLICATION OF GRANULAR, GASEOUS OR LIQUID MATERIAL TO SOIL

TECHNICAL FIELD

The present invention relates to farming implements and in particular to a device for subsoil dispensing of granular, liquid or gaseous material, usually granular fertilizer, simultaneously with the working of the soil by tools such as cultivator sweeps and with the dispensing of another material, usually seeds.

BACKGROUND OF THE INVENTION

The invention is particularly directed, but not limited, to the device of the above type which is used as an optional, auxiliary equipment for dispensing fertilizer and working in association with known and existing cultivator sweeps having a pointed nose portion and a pair of rearwardly divergent wings suitably shaped to work the soil as the sweep is forced through same. Some of such sweeps are known to be provided with seed distribution conduit system at the trailing end of the sweep for depositing the seeds to the soil at a suitable subsoil level.

The sweeps are usually secured to the frame of a farming implement by way of arcuately shaped shanks. The securement of the shanks, while virtually rigid, is usually accompanied by a resilient safety mechanism allowing retraction of the shank and thus of the sweep if the sweep encounters a solid obstacle such as a rock. This resilient mounting of the shank is well known and is not important for the function of the present invention. Therefore, for the purpose of the description of the invention, the shank is considered "rigid" with respect to the frame despite the fact that it always exhibits a degree of resiliency under severely overloaded conditions.

The subsoil application of seeds, fertilizer or other chemicals in granular, liquid or gaseous state or in a combination of same, and either separately or simultaneously, has been recognized as beneficial. A great variety of different devices for such application have been known and used.

U.S. Pat. NO. 3,618,538 (Brannan) shows a plow knife in which dry fertilizer is introduced at the back of the hoe. When viewed from the standpoint of the present invention, however, it fails to allow adjustability of the depth at which the fertilizer or the like is deposited. Nor is there means which would allow the dispensing or applicating device to be attached to an existing cultivator or the like unless complex and thus expensive modifications were made to same. U.S. Pat. No. 4,201,142 (Stump) and U.S. Pat. No. 4,628,839 (Edmisson) show other examples of the same basic approach to the problem.

U.S. Pat. No. 4,638,748 (Kopecky) discloses the combination of seed conduit with fertilizer release by a complex arrangement which presents an expensive solution. Moreover, it does not allow the flexibility of adjustable depth of deposition of the seeds, fertilizer or whatever material is being applied.

Canadian Patent 530,673 (Erdman) discloses an ejector type seeder machine. This patent shows that it is known to provide V-shaped sweeps with seed discharge means. From the standpoint of the present invention, however, it does not provide the possibility of administering another material, for instance a fertilizer, simultaneously with the deposition of the seeds and at a selectively adjustable level below the ground.

Canadian Patent 1,214,076 presents another interesting solution including a fertilizer feed tube 40 connecting to a fertilizer feed shank which, in turn, is secured to a rearwardly extending attachment boot. However, there is no inexpensive means of adding e.g. a fertilizer dispenser to an existing cultivator which is already provided with seed dispensing means.

U.S. Pat. No. 2,781,733 (Graham) shows a curved shank at the lower end of which is mounted a chisel the trailing surface of which coincides with a lower end of a shoe having passages for distributing a fertilizer. At the back of the hoe is provided inlet for fertilizer or the like in liquid form. The arrangement does not allow the use of the dispenser as an inexpensive, readily attachable auxiliary equipment. Nor do its structural features allow the selective adjustment of the subsoil depth at which the fertilizer is to be administered.

SUMMARY OF THE INVENTION

It is an object of the present invention to advance the art of the above farming implements by providing a device for dispensing granular, liquid or gaseous matter simultaneously with the operation of a cultivator sweep which may, but does not necessarily have to, be equipped for distribution of other particles or matter, particularly seeds. At the same time, the object is to avoid the need for expensive modification of existing farming implements using the aforesaid sweeps.

In general terms, the invention provides a device for application of granular, gaseous or liquid material to the soil, comprising, in combination: a rigid, earth penetrating, elongated body having a first end portion, a second end portion, a leading wall portion, a trailing wall portion and opposed side wall portions extending between the leading and trailing wall portions; said body enclosing a conduit for said material, said conduit having an inlet port section near the first end portion of the body, and a discharge port section near the second end of the body; securement means for rigidly securing the body to a farming implement, said securement means being disposed at a first securement point near the first end portion and at a second securement point near the second end portion of the body said securement means near said first securement point including mounting means for mounting said body to a support shank of the frame of a farming implement; a rigid, earth working, abrasion protective stem complementary with and rigidly secured to said body to overlap a substantial portion of said leading wall portion while extending beyond the length of the body, over said second end of the body.

Preferably, the protective stem is secured to the body by releasable clamp means for clamping the stem to the body at a selected length of extending over said second end, whereby the distance between a free end tip of the stem from the discharge port section is selectively adjustable. According to another preferred feature of the invention, the securement means at said second point includes an abutment seat at said trailing wall portion of said body, said seat being complementary with a tip portion of an existing earth working tool. It is also preferred that the discharge port section coincide with said second end portion and be limited by said leading wall portion, said trailing wall portion and said opposed side wall portions. According to a still further preferred feature, the body is of a generally rectangular cross-section and the contour of sides of said protective stem generally corresponds to that of said leading wall portion.

BRIEF DESCRIPTION OF THE DRAWINGS

The invention will now be described by way of a preferred embodiment, with reference to the accompanying simplified, diagrammatic drawings, wherein.

DETAILED DESCRIPTION OF THE INVENTION

Figure 1:
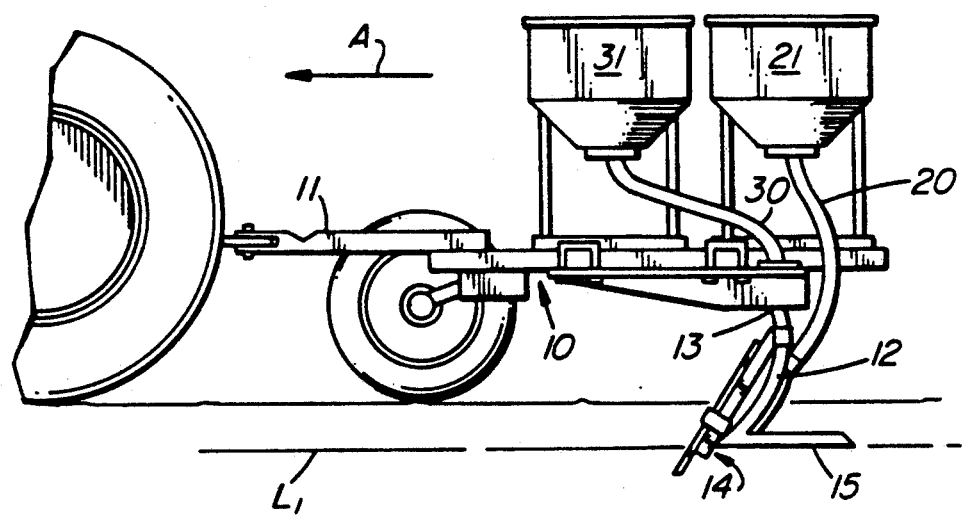
FIG. 1 is a simplified diagrammatic side view showing the overall arrangement of the device of the present invention in an existing farming implement.

Turning first to FIG. 1, reference numeral 10 designates a farming implement frame provided with a towing bar 11 by which the implement is secured to a tractor. The direction of towing is indicated by an arrow A, which thus designates the sense in which the leading and the opposite, trailing surfaces referred to hereinafter are oriented. The frame 10 carries a plurality of arcuate shanks 12 (only one shown in the drawings) each of which is secured to the frame at its upper end 13 and carries, at its free lower end 14. a cultivator sweep 15.

Figure 2:
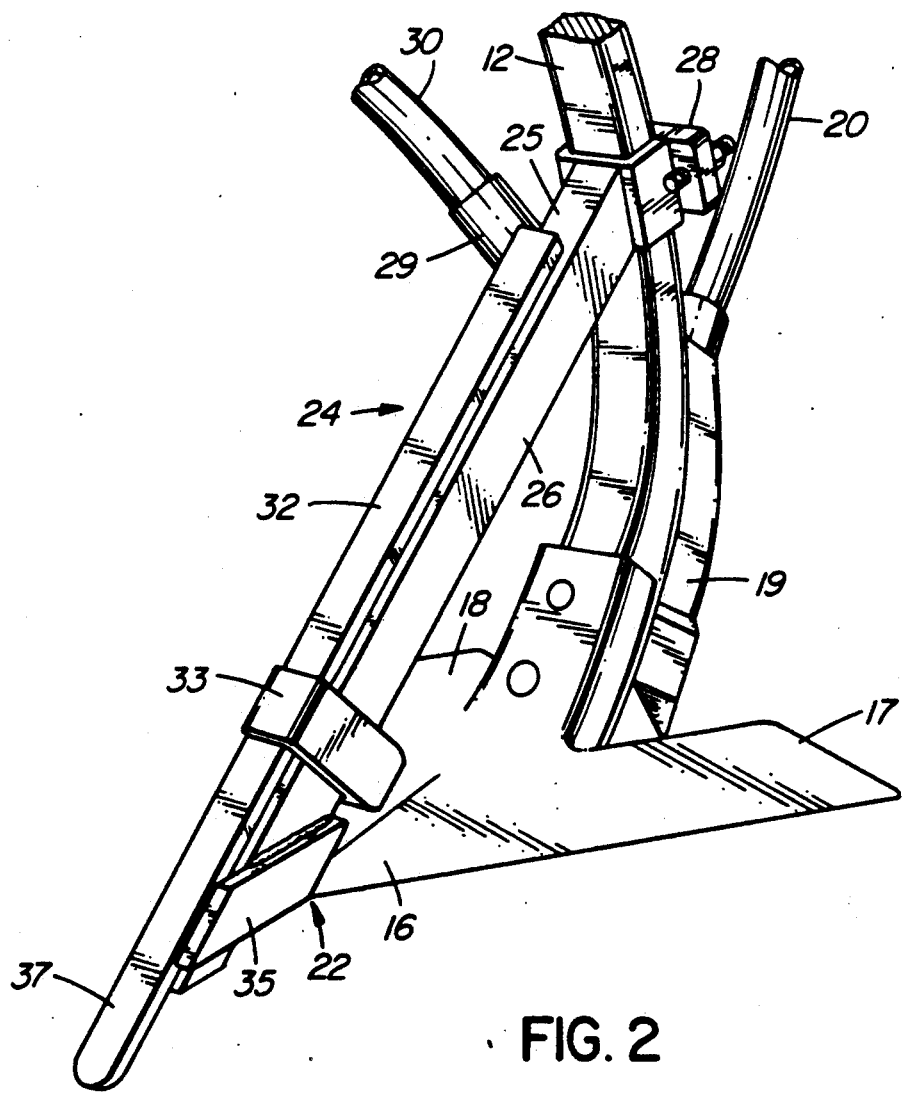
FIG. 2 is a simplified, top front perspective view with certain parts omitted for clarity, showing the device of the present invention in greater detail.
Figure 3:
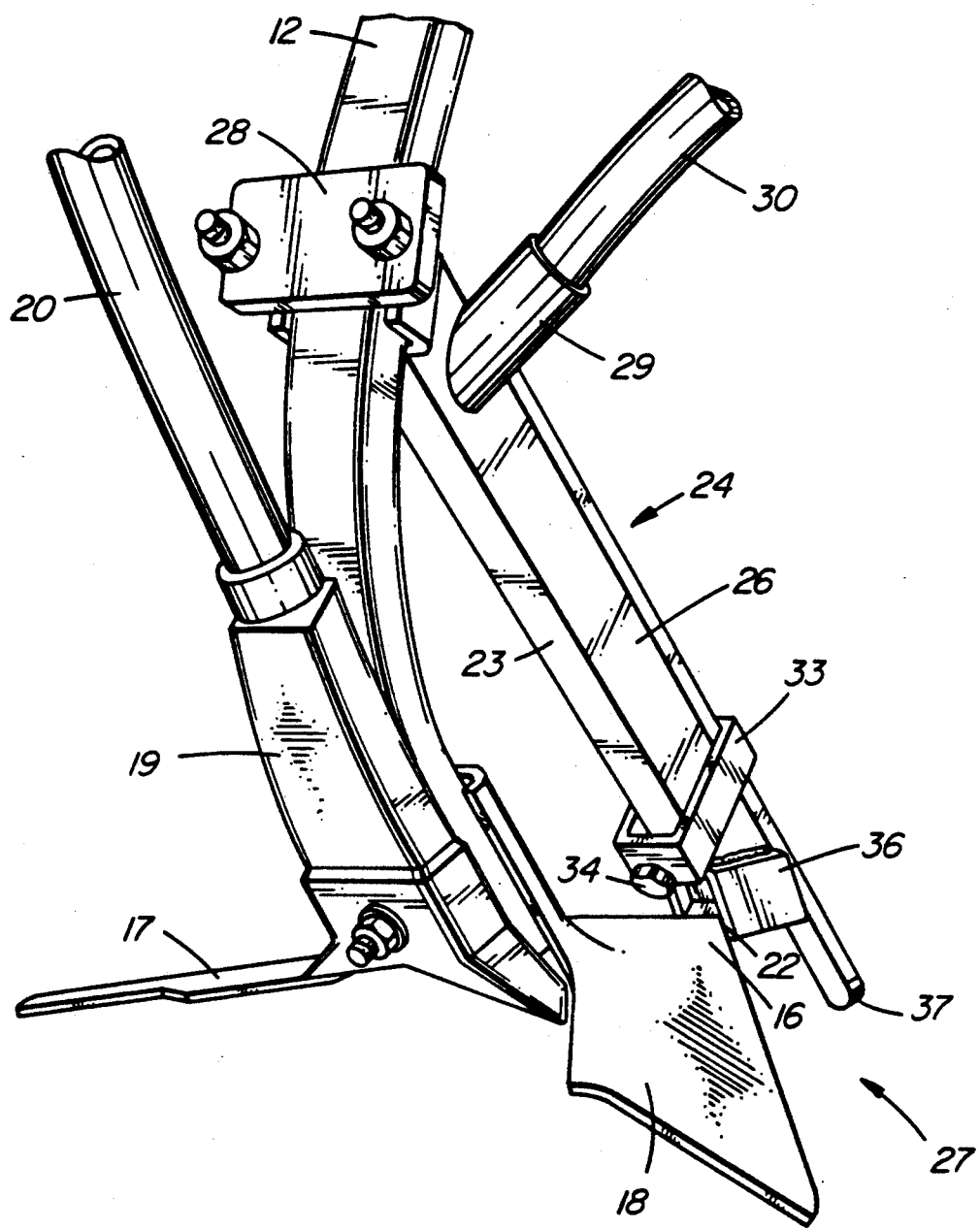
FIG. 3 is a top rear perspective view of what is shown in FIG. 2.
Figure 4:
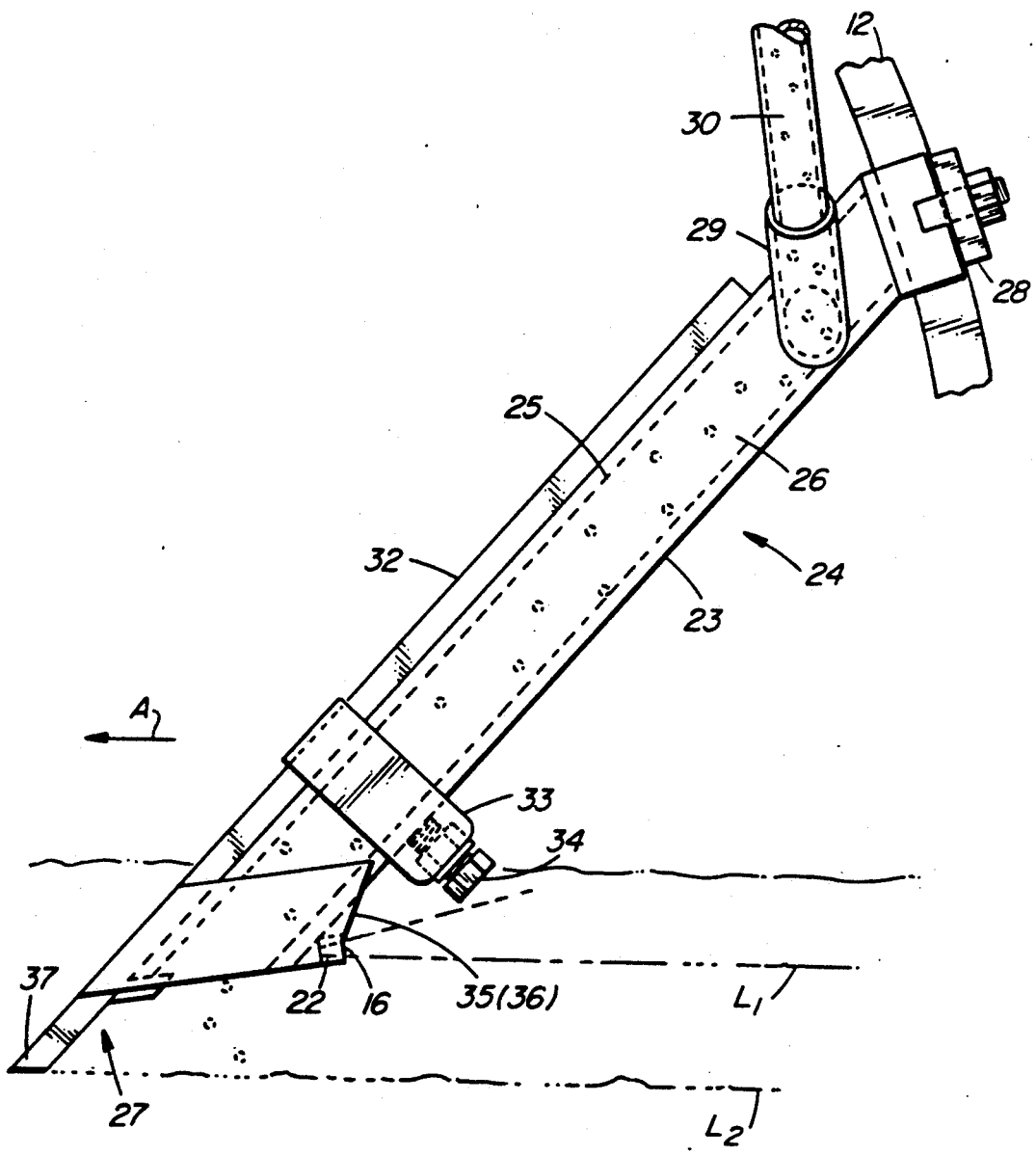
FIG. 4 is a diagrammatic section of the device with certain parts omitted for clarity.

Referring now to FIGS. 2-4, each sweep 15 has a forwardly pointed or leading nose portion 16 from which protrude rearwards and sideways two wings 17, 18. Each sweep 15 is operatively associated with a seed dispenser 19 disposed behind the nose portion 16. The dispensing means 19 communicates through a hose 20 with a seed supply hopper 21 (FIG. 1) provided with suitable (e.g. pneumatic) means for feeding seed to the dispenser 19 in a metered fashion.

The parts mentioned above are well known in the art and therefore are not described in detail. It will suffice to mention at this point, that seeds (FIG. 1) are placed at a subsoil level $L_1$ which is generally coincident with the level at which the wings 17, 18 work the soil.

The tip of the nose portion 16 in FIG. 2 is shown as being engaged with a depression or seat 22 provided in a rear or trailing wall portion 23 of a rigid, earth penetrating, elongated body 24. The body 24 is of rectangular cross-section and further has a leading or front wall portion 25, and two side wall portions 26. The wall portions 25, 26 combine with the first mentioned trailing wall portion 23 to define a rectangular conduit open at its lower end 27 which is also referred to as a lower end portion 27 of the body 24. The size of the components of the body 24 is selected such as to render the body rigid enough to penetrate the soil as the implement is towed across the field. In the embodiment shown, the width of the leading and trailing wall portions 25, 23 is about 1 inch, while the width of the side wall portions 26 as seen in FIG. 4 is about 2 inches. The thickness of the walls is about 3/16 inch. The walls are welded together to form the body 24.

Welded to the upper end of the body 24 is a clamp 28 which fixedly secures the entire body 24 to the respective shank 12. The shank clamp 28 combines with the seat 22 to provide a fixed securement of the body 24 to the frame 10 of the implement, the qualification being in that the reference "fixed" disregards the resilient mounting of the shank 12 itself to the frame 10. Thus, each body 24 is "fixedly" secured to the frame 10 at an upper securement point (the clamp 28) and at a lower securement point (seat 22).

An inlet port section 29 communicates, via another hose 30 with a hopper 31 (FIG. 1) containing granular fertilizer. Thus, in general terms, the conduit has an inlet port section and a discharge port section, the latter being the open lower end 27.

The leading wall portion 25 is virtually entirely covered, with a rigid earth working abrasion protective stem or tooth 32 the width of which is generally the same as that of the body 24. The tooth 32 is held to the body 24 at two points: by a clamp 33 provided at the rear end with a tightening bolt 34 and by two side plates 35, 36 each welded to the respective side wall portion 26 to provide a side engagement guide for the tooth 32. The lower end 37 of the tooth 32 protrudes below the length of the body 24 to a level $L_2$ (FIG. 4) which is below the level L at which the seed is deposited by the know device.

In use, assuming, as an example, that it is desired to improve an existing cultivator by addition to it of a fertilizer dispensing device, the body 24 is clamped by the clamp 28 to the arcuate stem relatively close to its upper end 13 while resting the seat 22 against the tip of the nose portion 16 of the existing sweep 15. Thus, a simple clamping by the clamp 28 is all that is required to secure the body 24 to the respective sweep. Associated hoses 30 are then suitably connected to the inlet ports 29 of each body 24 after a hopper 31 had been secured to the frame 10 of the sweep at a suitable location. The hopper 31 and its securement together with any additional mechanisms for metered dispensing of the fertilizer does not form a part of the present invention and is therefore not shown in detail.

Next, the tooth 32 is clamped to the leading face 25 of the body 24 with the lower end 37 protruding at a selectively adjustable distance beyond the end of the body 24, i.e. below the level of the lower end 27 of the body which, in the embodiment shown, generally coincides with the level of working of the earth by the sweep 15. The tooth 32 is guided between the side plates 35, 36 and the tightening of the bolt 34 of clamp 33 is all that is required to secure the tooth to the leading face of the body.

It will be appreciated that the present invention provides extremely simple means for controlling the depth or level $L_2$ at which the fertilizer is deposited despite the fact that the position of the discharge port at 27 for the fertilizer in the body 24 is fixed with respect to the level of the sweep itself. This is beneficial in many ways since the application of different fertilizers and different seeds may require specific difference between levels $L_1$ and $L_2$.

Those skilled in the art will readily appreciate that many embodiments may exist which would differ to a greater or lesser degree from the embodiment described above. Many such embodiments, however, do not depart from the scope of the present invention.

Accordingly, we wish to protect by letters patent issued on the present application all such embodiments as properly fall within the scope of our contribution to the art.

The embodiments of the invention in which an exclusive right or privilege is claimed are defined as follows:

1. A device for application of granular, gaseous or liquid material to the soil, comprising, in combination:
   a) a rigid, earth penetrating, elongated body having a first end portion, a second end portion, a leading wall portion, a trailing wall portion and opposed side wall portions extending between the leading and trailing wall portions;
   b) said body enclosing a conduit for said material, said conduit having an inlet port section near the first end portion of the body, and a discharge port section near the second end of the body;
   c) securement means for rigidly securing the body to a farming implement, said securement means being disposed at a first securement point near the first end portion, and at a second securement point near the second end portion of said body;
   d) said securement means near said first securement point including mounting means for mounting said body to a support shank of the frame of a farming implement;
   e) a rigid, earth working, abrasion protective stem complementary with and rigidly secured to said body to overlap a substantial portion of said leading wall portion while extending beyond the length of the body, over said second end of the body;
   f) the protective stem being secured to the body by releasable mounting means for securing the stem to the body at a selected length of extending over said second end, whereby the distance between a free end tip of the stem from the distance port section is selectively adjustable.

2. The device of claim 1, wherein said discharge port section coincides with said second end portion and is limited by said leading wall portion, said trailing wall portion and said opposed side wall portions.

3. The device of claim 1, wherein said body is of a generally rectangular cross-section and wherein the contour of sides of said protective stem generally corresponds to that of said leading wall portion.

4. The device of claim 1, wherein said body is of a generally rectangular cross-section and wherein the contour of sides of said protective stem generally corresponds to that of said leading wall portion; and said discharge port section coincides with said second end portion and is limited by said leading wall portion, said trailing wall portion and said opposed side wall portions.

5. A farming implement comprising a frame and a plurality of arcuate support shanks, each shank carrying at its normally lower free end a cultivator sweep having a pointed nose portion and two rearwardly divergent wings each of the cultivator sweeps being provided with seed dispensing means for dispensing seeds at a subsoil level generally coincident wit the level of penetration of the soil by the wings, said implement being further provided with applicator for granular, gaseous or liquid fertilizer material, said application including:
   a) a rigid earth penetrating elongated body having an upper end portion, a lower end portion, a leading wall portion, a trailing wall portion and opposed side wall portions extending between the lead and trailing wall portions;
   b) said body enclosing a conduit for said material, said conduit having an inlet port section near the upper end portion of the body, and a discharge port section near the lower end of the body;
   c) securement means rigidly securing the body to the shank and thus to the frame of the implement, said securement means being disposed at an upper securement point and at a lower securement point of the body, the upper securement point being near the upper end portion of the body, the lower securement point being near the lower end portion of said body;
   d) said securement means at said upper securement point including mounting clamp means mounting said body to the respective support shank;
   e) a rigid, earth working, abrasion protective stem complementary with and rigidly secured to said body to overlap a substantial portion of said leading wall portion while extending beyond the length of the body, below said lower end of the body;
   f) wherein the protective stem is secured to the body by releasable mounting means mounting the stem to the body at a selected length of extending below said lower end, whereby the distance between the lower end of the protective stem from the discharge port section is selectively adjustable.

6. The device of claim 5, wherein said discharge port section coincides with said lower end portion of the body and is limited by said leading wall portion, said trailing wall portion and said opposed side wall portions.

7. The device of claim 5, wherein said body is of a generally rectangular cross-section and wherein the contour of sides of said protective stem generally corresponds to that of said leading wall portion, when the implement is viewed from the front.

8. A farming implement comprising a frame and a plurality of arcuate support shanks, each shank carrying at its normally lower free end a cultivator sweep having a pointed nose portion and two rearwardly divergent wings each of the cultivator sweeps being provided with seed dispensing means for dispensing seeds at a sub soil level generally coincident with the level of penetration of the soil by the wings, said implement being further provided with applicator for granular, gaseous or liquid fertilizer material, said application including:
   a) a rigid earth penetrating elongated body having an upper end portion, a lower end portion, a leading wall portion, a trailing wall portion and opposed side wall portions extending between the lead and trailing wall portions;
   b) said body enclosing a conduit for said material, said conduit having an inlet port section near the upper end portion of the body, and a discharge port section near the lower end of the body;
   securement means rigidly securing the body to the shank and thus to the frame of the implement, said securement means being disposed at an upper securement point and at a lower securement point of the body, the upper securement point being near the upper end portion of the body, the lower securement point being near the lower end portion of said body;
   d) said securement means at said upper securement point including mounting clamp means mounting said body to the respective support shank;
   e) a rigid, earth working, abrasion protective stem complementary with and rigidly secured to said body to overlap a substantial portion of said leading wall portion while extending beyond the length of the body, below said lower end of the body;
   f) wherein said securement means further includes an abutment seat located at said lower securement point and being generally in coincidence with the trailing wall portion of said body, said seat being complementary with and engaging the pointed tip of the respective sweep.

* * * * *